June 29, 1926. 1,590,979
H. KUYPERS
CINEMATOGRAPHIC OR LIKE FILM
Filed Feb. 9, 1914
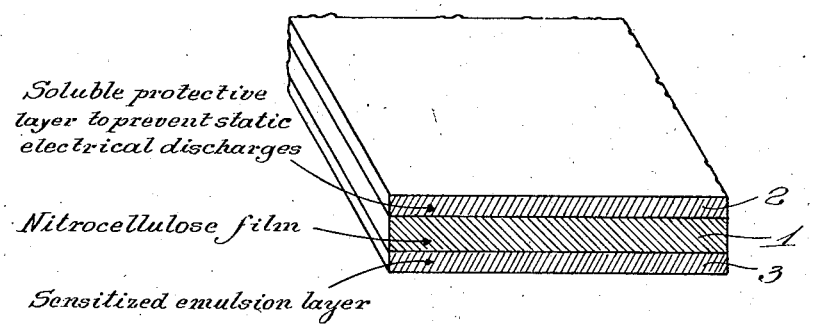
Inventor
Hendrik Kuypers
Witness
By H. B. Willson & Co.
Attorneys Patented June 29, 1926.

1,590,979

UNITED STATES PATENT OFFICE.

HENDRIK KUYPERS, OF VIEUX DIEU, ANVERS, BELGIUM, ASSIGNOR TO GEVAERT PHOTO PRODUCTEN: N. V., OF OUDE-GOD, NEAR ANTWERP, BELGIUM.

CINEMATOGRAPHIC OR LIKE FILM.

Application filed February 9, 1914, Serial No. 817,687, and in Belgium April 14, 1913.

This invention relates to improvements in cinematographic and like films.

The object of the invention is to produce a film of this character which will not be electrified by the friction of the film against the end rollers of the apparatus while the film is in use.

Cinematographic films are formed from a strip of celluloid, one side of which is coated with a layer of sensitized gelatine, while the other side is uncoated. Celluloid being a readily electrified substance, the slightest friction between the unsensitized side of the film and the surface over which it is moved will suffice to produce electric discharges, and the luminosity of these discharges affects the sensitive layer and not infrequently renders the film useless.

The accompanying drawing represents a perspective view of a film constructed in accordance with this invention.

The film constituting this invention eliminates the drawback above referred to by preventing any friction between the celluloid film proper and the apparatus. This result is obtained by covering the non-sensitized side of the transparent, flexible support or film 1 with a layer 2 of any suitable substance which is not readily electrified by friction, the other side thereof being covered by the usual sensitized gelatine layer 3. The exposed or bare side of the film is covered by a thin layer or coating of suitable substance which is not readily electrified by friction and which is also soluble in water at low temperatures or in the baths used for developing. This layer may be formed for example by covering the bare side of the film with a five per cent solution of dextrin or a suitable solution of other gum-like substance. This soluble substance will readily dissolve in the different baths used for developing, fixing and washing, and hence disappears when the action of the electric discharge ceases to be dangerous for the sensitized side of the film.

This layer may be colored or not, and may be either transparent or opaque. It covers and protects the celluloid film from any frictional contact that would tend to generate static electricity, and performs the double function of preventing electrifying of the films by friction and scratching thereof. It is an exposed, wear-taking coating and is disposed next adjacent to and in intimate contact with the surface of the film.

I claim as my invention:—

1. As an article of manufacture, a photographic film strip embodying a transparent flexible support having a sensitized coating on its face and an exposed, wear-taking coating or layer of a gum-like substance on its reverse side, soluble in water at low temperatures, and disposed next adjacent to and in intimate contact with the surface of the support.

2. As an article of manufacture, a photographic film strip embodying a transparent flexible support made of a material that will by friction readily create static electrical charges and having a sensitized coating on one face and on its reverse face and in intimate contact therewith, an exposed, wear-taking coating or layer of a substance which is soluble in the developing baths and is effective to prevent the frictional electrification of the support.

In testimony whereof I affix my signature.

HENDRIK KUYPERS.